United States Patent
Gruber et al.

(10) Patent No.: US 10,538,448 B2
(45) Date of Patent: Jan. 21, 2020

(54) PROCESS FOR WASTE CONFINEMENT BY VITRIFICATION IN METAL CANS

(75) Inventors: Philippe Gruber, Villeneuve les Avignon (FR); Olivier Pinet, Poulx (FR); Hélène Rabiller, Toulouse (FR); Roger Boen, Saint-Alexandre (FR); Nicolas Bousquet, Villevieille (FR); Jean-Luc Dussossdy, Jacou (FR); Jacques Lacombe, Pujaut (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 12/737,617

(22) PCT Filed: Jul. 28, 2009

(86) PCT No.: PCT/EP2009/059735
§ 371 (c)(1),
(2), (4) Date: Feb. 23, 2011

(87) PCT Pub. No.: WO2010/012726
PCT Pub. Date: Feb. 4, 2010

(65) Prior Publication Data
US 2011/0144408 A1 Jun. 16, 2011

(30) Foreign Application Priority Data
Jul. 28, 2008 (FR) .................................... 08 55168

(51) Int. Cl.
*C03B 5/00* (2006.01)
*B09B 3/00* (2006.01)

(52) U.S. Cl.
CPC .................................. *C03B 5/005* (2013.01)

(58) Field of Classification Search
None
See application file for complete search history.

(56) References Cited

U.S. PATENT DOCUMENTS 3,365,578 A * 1/1968 Grover .................... C03C 3/062
250/493.1
4,404,129 A * 9/1983 Penberthy et al. ............. 588/11
(Continued)

FOREIGN PATENT DOCUMENTS

FR 2888576 1/2007
JP 11049520 * 2/1999
(Continued)

OTHER PUBLICATIONS

Translation of JP 11049520 Nagashima reference (Feb. 1999).*
(Continued)

*Primary Examiner* — Sheng H Davis
(74) *Attorney, Agent, or Firm* — Pearne & Gordon LLP

(57) ABSTRACT

Process for confinement of waste containing at least one chemical species to be confined, by in-can vitrification in a hot metal can into which waste and a vitrification additive are added, the waste and the vitrification additive are melted to obtain a glass melt which is then cooled, characterised in that at least one oxidising agent is also added into the metal can and in that the concentration of oxidising agent(s) expressed as oxide(s) in the glass melt is between 0.1 and 20% by mass, preferably 4 and 20% by mass, even more preferably 5 and 15% by mass, and even more preferably 10 and 13% by mass of the glass melt mass.

37 Claims, 1 Drawing Sheet

(56) References Cited

U.S. PATENT DOCUMENTS

| | | | |
|---|---|---|---|
| 4,581,163 A * | 4/1986 | Meininger et al. | 588/3 |
| 5,421,275 A | 6/1995 | Elliott et al. | |
| 5,461,185 A * | 10/1995 | Forsberg et al. | 588/11 |
| 5,573,564 A | 11/1996 | Richards | |
| 2001/0029753 A1* | 10/2001 | Jantzen | C03C 1/002 65/134.3 |
| 2006/0019815 A1* | 1/2006 | Inoue et al. | 501/72 |
| 2006/0129018 A1* | 6/2006 | Chekhmir et al. | 588/11 |
| 2007/0105705 A1* | 5/2007 | Fukuda et al. | 501/80 |
| 2008/0020918 A1* | 1/2008 | Chekhmir et al. | 501/66 |
| 2008/0264311 A1* | 10/2008 | Pinet | C03B 3/02 110/346 |
| 2008/0281141 A1* | 11/2008 | Pinet | B09B 3/005 588/11 |
| 2009/0023973 A1* | 1/2009 | Lowery et al. | 588/252 |
| 2009/0107830 A1* | 4/2009 | Gehring | C10G 1/10 202/99 |

FOREIGN PATENT DOCUMENTS

| | | | |
|---|---|---|---|
| JP | 2001027694 | * | 1/2001 |
| JP | 2003-294890 | | 10/2003 |
| RU | 2152652 | | 7/2000 |
| WO | 1997005630 | | 2/1997 |

OTHER PUBLICATIONS

English translation of FR 2487328.*

Wang X-T et al., "Influence of atmospheres on behavior of heavy metals during melting process of fly ashes from municipal solid waste incinerator", XP002518566; and Zhongguo Dianji Gongcheng, Xuebao/Proceedings of the Chinese Society of Electrical Engineering . . . , vol. 26, No. 7, Apr. 1, 2006, pp. 47-52

Nathan J. Cassingham, et al., Property modification of a high level nuclear waste borosilicate glass through the addition of $Fe_2O_3$, Manuscript, Glass Technol. Eur. J. Glass Sci. Technol. A, Feb. 2008, 49 (1), 21-26.

Henry D. Schreiber, et al., Redox Chemistry in Candidate Glasses for Nuclear Waste Immobilization, Journal, J. Am. Ceram. Soc., 70 (8) 591-594.

Antoine Jouan, et al., La Vitrification Continue Des Solutions Concentrees De Produits De Fission, Journal, Annals of Nuclear Energy, vol. 3, 1976, pp. 275-283.

* cited by examiner

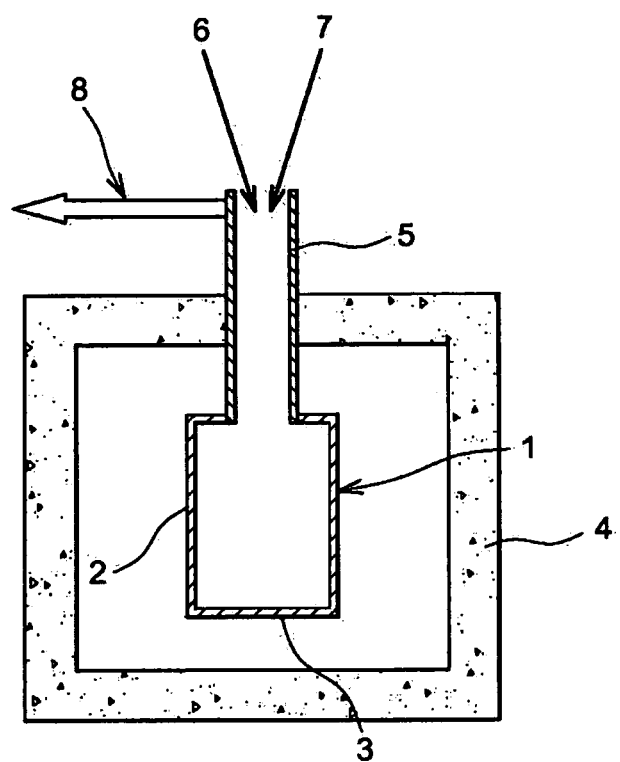

PROCESS FOR WASTE CONFINEMENT BY VITRIFICATION IN METAL CANS

TECHNICAL FIELD

This invention relates to a process for waste confinement, containment, by vitrification in a metal can.

More precisely, the process according to the invention is an improvement to vitrification waste confinement processes that use a hot metal can as the production crucible.

The technical field of the invention may thus be defined in general as the treatment of waste or effluents by confinement, coating or immobilisation.

More particularly, the technical field of the invention is waste confinement by vitrification and more precisely by vitrification in hot metal cans.

This waste may be solid waste, or liquid waste particularly in the form of solutions.

It may be nuclear waste, but it could also be any industrial or household waste that contains mineral species, and particularly polluting metals and/or polluting metallic ions.

For example such waste might include solid residues from the incineration of household waste, particularly residues formed by boiler ash, fly ash and filtration cakes originating from the neutralisation and treatment of incineration exhaust gases.

In vitrification processes using hot metal cans, pots, waste and vitrification additives are added into a metal can at high temperature so that waste decomposition reactions occur, and minerals contained in waste such as chemically toxic elements or radioactive species are embedded in a vitreous lattice.

Depending on the vitrification process used, once the metal can has been filled with molten glass, either the glass is poured into a container in which it is cooled, and the process is called "hot crucible" process, or the metal can is taken out of the furnace and then cooled and used as a container for the final glass, and the process is then called "in-can melting" method. This disclosure applies to the latter type of method.

STATE OF PRIOR ART

Confinement, containment, glasses produced industrially at the present time such as confinement glass for nuclear waste or household waste incineration residues are derived from formulation studies that optimise their compositions and even their production temperatures, if the production temperature is not already fixed by constraints related to the process or to the composition of the glass.

These composition and temperature optimisations are aimed at obtaining a glass formulation that can:
  reduce the volume of waste once it has been confined,
  be compatible with production in industrial methods, particularly processes available at the present time,
  improve confinement qualities of the final glass matrix (chemical durability, resistance to irradiation, resistance to leaching, etc.), with a view to the storage thereof.

Thus, existing processes for the vitrification of nuclear wastes such as fission products usually include two steps, firstly evaporation-calcination of fission product solutions to obtain a calcine, cullet, followed by vitrification of the calcine, cullet formed. For example, the evaporation-calcination step may be carried out in a rotating tube heated in a resistance furnace. This process is known to the man skilled in the art.

A forming glass, vitrification additive for example in the form of glass frit, is then added to the calcine, cullet, to produce the confinement glass. For example in the La Hague plant, the confinement glass is a borosilicate glass composed mainly of about 80% of $SiO_2$ (silica), $B_2O_3$ (boric oxide), $Al_2O_3$ (alumina) and $Na_2O$ (sodium oxide).

In existing vitrification processes like that described above for the confinement of nuclear wastes, the role of the vitrification additive such as a glass frit is simply to provide elements so that once they have been mixed with the waste, will result in confinement of the waste in a glass with the required properties, some of which were mentioned above.

In the special case of in-can waste vitrification processes using hot metal cans, there are strong interactions between the melting glass and the metal can.

Measures used in the past to limit chemical interactions with the glass bath, corrosion of the metal can and loss of its integrity used a combination of several actions, namely a limited temperature of the glass bath, a very short residence time of the glass bath in the hot metal can, and the use of special steels to provide good resistance to corrosion.

The essential purpose of these measures is to avoid corrosion of the heated metal can and to maintain integrity of this can, and they are partly effective, but they have the disadvantage of requiring the use of expensive metal materials for the melting cans, which has an adverse effect on the global cost of the process, limiting glass production durations and temperatures, which reduces the range of glasses that can be produced and the range of wastes that can be treated.

Furthermore, unexpected and severe volatilisation, degassing and foaming phenomena can occur during the glass production in hot metal cans for some configurations of the vitrification process, and the origin of these phenomena that are extremely prejudicial to the smooth progress of the vitrification process, particularly for the vitrification of radioactive nuclear waste, has not yet been fully elucidated.

Degassing usually means the leaving of chemical elements in the form of gas from the glass bath.

Foaming usually means the accumulation of bubbles on the surface of the molten glass bath.

Foaming may cause molten glass to spill outside the melting can.

Foaming is a possible consequence of the degassing phenomenon in the glass bath.

No solution has been found so far to these volatilisation, degassing and foaming problems.

Furthermore, the formation of metallic species or sulphides that are dispersed or have precipitated, settled, in the glass is frequently observed in hot metal can waste vitrification processes, and their presence is very annoying.

Finally, it is sometimes impossible to confine some elements such as Cd.

Therefore, considering the above, there is a need for a process for confining, containing, wastes by vitrification in a heated metal can wherein volatilisation, degassing and foaming phenomena have been eliminated or at least limited.

There is also a need for a process that could also optionally reduce corrosion of the metal can and eliminate the formation of metal species or sulphides dispersed or precipitated in the glass.

There is also a need for a process that maintains the integrity of the metal can and gives excellent confinement, containment of all elements and even elements such as Cd or any other metal species for which the reduced form is volatile (for example Zn).

There is also a need for such a process for waste confinement, containment by vitrification in a heated metal can that is simple and reliable, has a low operating cost and uses easily available low cost materials.

The purpose of this invention is to provide a process for waste confinement, containment by vitrification in a heated metal can that satisfies inter alia these needs.

Another purpose of this invention is to provide a process for waste confinement by vitrification in a heated metal can that does not have the disadvantages, defects, limitations and drawbacks of the processes for waste confinement by vitrification in a heated metal can according to the prior art, particularly in terms of volatilisation, degassing and foaming, and that provides a solution to the problems of the processes according to the prior art.

More precisely and in short, the purpose of this invention is to overcome problems specific to metal can, "in-can" processes, particularly corrosion and foaming due to the volatilisation of species in the glass bath reduced by the melting can.

PRESENTATION OF THE INVENTION

This and other purposes are achieved according to the invention, by a process for confining a waste containing at least one chemical species to be confined, by vitrification in a heated metal can wherein the waste and a vitrification additive are fed into the metal can, the waste and the vitrification additive are melted to obtain a glass melt, and the glass melt is cooled, characterised in that at least one oxidising agent is further fed into the metal can and in that the concentration of oxidising agent(s) expressed as oxide(s) in the glass melt is from 0.1 to 20% by mass, preferably from 4 to 20% by mass, more preferably from 5 to 15% by mass, and even more preferably from 10 to 13% by mass of the mass of the glass melt.

The inventors have identified, and that had never been done before, the cause of volatilisation and foaming problems that occur in heated metal cans, and have surprisingly provided a solution to these problems by feeding, according to the invention, an oxidising agent into the metal can in addition to the waste and to the vitrification additive.

The inventors have shown that the degassing (gas freeing) and foaming phenomena were actually due to the reduction of some species present in the molten glass bath under the action of the metal can, this reduction creating volatile reduced forms at the working temperature of the process.

More precisely, glass formulations are based on oxides and are often of the silicate or borosilicate type. Among the elements making up, constituting the glass waste, many of said elements can exist in different states of oxidation, namely $Fe^{3+}/^{2+}/^{0}$, $Zn^{2+}/Zn^{0}$, $Cd^{2+}/Cd$, $Cr^{6+}/Cr^{3+}/Cr^{2+}/Cr^{0}$, $S^{6+}/^{4+}/^{0}/^{-2}$, $Ni^{2+}/^{0}$, $Mn^{3+}/^{2+}/^{0}$, $Mo^{6+}/^{5+}/^{4+}/^{3+}/^{0}$, $Cs^{+}/Cs^{0}$ .... These elements originate particularly from the waste but they may also be included in the glass formulation by means of the vitrification additive if there is an advantage in doing so. The inventors have observed that the can can act as a powerful reducing agent reducing the glass bath and multivalent elements contained in it. Conversely, metallic elements of the metal can are oxidised and diffuse in the glass. Reduction phenomena vary depending on the residence time at high temperature, the temperatures involved, the composition of the glass and the nature of the metals used for the metal cans.

The inventors have thus observed that very low partial oxygen pressures of the order of $10^{-9}$ atmospheres, can be reached in oxide glass after a few hours of operation at the process temperature (1100° C.) Under these conditions, many elements with several valency states can be reduced, resulting in volatile species.

In other words, degassing and foaming are the result of the volatilisation of some species in the molten glass bath for which the reduced form is volatile at the working temperature of the process, for example approximately 1100° C. For example, this is the case for cadmium and zinc for which the boiling temperatures of the metal forms are 767° C. and 907° C. respectively, and for other species such as caesium.

The inventors have thus demonstrated that this volatilisation can have two main harmful consequences, namely:
  as already mentioned, it can induce the degassing and foaming phenomena mentioned above, which are extremely prejudicial to smooth progress of the vitrification process;
  it prevents confinement, containment of elements such as cadmium in the waste to be fixed, trapped.

There was nothing earlier to suggest that the degassing and foaming problems could originate from the unwanted reduction of some species in the molten glass bath, or the glass melt located in the can.

Consequently, there was nothing to suggest that the degassing and foaming problems could be solved by adding, feeding oxidising agents into the heated metal can, in other words into the melting glass bath or the glass melt located in the metal can.

Without wishing to be bound by any theory, the addition, feeding of an oxidising agent into the heated metal can can quantitatively mitigate, counteract, the reduction reactions of elements such as the multivalent elements of the glass, by the metal can.

Consequently, due to the addition, feeding of oxidising agents into the heated metal can, the process according to the invention can surprisingly:
  totally eliminate or limit volatilisation of volatile species present in a reduced form;
  totally eliminate or limit degassing and foaming phenomena related to volatilisation of these species.

Also and surprisingly, it has been demonstrated that the addition of oxidising agents into the can can also:
  totally eliminate or limit the formation of metal species or sulphides dispersed or settled in the final glass;
  possibly limit corrosion of the melting can by choosing an appropriate oxidising agent such as $Fe_2O_3$, this limitation of the corrosion of the melting can occurring at the same time as the limitation of the reduction of the glass bath by the metal can;
  maintain the integrity of the metal can;
  use less expensive metal materials for the melting cans due to lesser corrosion caused by the bath;
  use longer periods for glass production, while avoiding unacceptable reduction of the glass melt, which makes it possible to envisage processes with long waiting phases, namely from a few minutes (for example 2, 3, 5, 10 minutes) to several tens of hours (for example 20, 30, 40, 50, 100 hours) at high temperature (for example of the order of 1100° C.)
  allow confinement, containment of species such as Cd that has been problematic in the past.

Document FR-A-2 888 576 discloses the reduction of foaming phenomena in molten glass used to vitrify fission products using a reducing frit as a vitrification additive, but the process disclosed in this document is not specifically a vitrification process in a heated metal can according to the meaning of the present invention.

The teachings of said document cannot be used for vitrification in a heated metal can. The cause of the foaming mentioned in the document is fundamentally different from the cause of the foaming found by the inventors with vitrification in metal can, namely the departure of oxygen in the form of bubbles due to an excessively oxidising medium.

In other words, this document does not specifically concern vitrification in a metal can, nor problems specific to this process in a metal can such as corrosion and foaming related to volatilisation of species of the glass bath which are reduced by the melting can. It does not mention nor suggest any solution for solving these problems.

Advantageously, the oxidising agent(s) may be chosen from among multivalent oxidising agents.

Advantageously, the oxidising agent(s) is (are) thus chosen from among multivalent oxidising species (with a high oxidisation level) of iron, chromium, vanadium, antimony, titanium, arsenic, cerium, manganese, chromium, ruthenium and mixtures thereof.

Preferably, the oxidising agent(s) is (are) chosen from among $Fe^{3+}$, $Ce^{4+}$, $Mn^{4+}$, $Sb^{5+}$, $As^{5+}$, $V^{5+}$, $Ru^{4+}$, and mixtures thereof.

Advantageously, the oxidising agent(s) such as the multivalent oxidising species may be in the form of their oxides, or precursors of these oxides.

Advantageously, the at least one oxidising agent is an agent that has a limiting effect on the corrosion of the metal can, such as $Fe_2O_3$.

The concentration of oxidising agent(s) expressed as oxide(s) in the glass melt may usually be from 0.1 to 20% by mass, preferably 4 to 20% by mass, more preferably 5 to 15% by mass and even more preferably 10 to 13% by mass, of the glass melt.

This concentration depends particularly on the nature of the oxidising agent. The concentration of the oxidising agent (concentration given for an oxidising agent used alone) may thus be from 0.1% to 1% by mass for $Cr^{3+}$, expressed as $Cr_2O_3$; from 1 to 15% by mass for $V^{5+}$, expressed as $V_2O_5$; from 0.5 to 7 or 8% by mass for $Sb^{5+}$, expressed as $Sb_2O_5$; from 1 to 15% by mass for $Ti^{4+}$, expressed as $TiO_2$; from 0.5 to 7 or 8% by mass for $As^{5+}$, expressed as $As_2O_5$; from 0.5 to 10% by mass for $Ce^{4+}$, expressed as $CeO_2$; from 0.1 to 2% by mass for $Mn^{4+}$, expressed as $MnO_2$; and from 1 to 20%, preferably 1 to 15%, more preferably from 3 to 13%, better from 4 or 5 to 13%, or still better from 10 to 13% by mass, and preferably from 12 to 13% by mass, for example 12.6% by mass for $Fe^{3+}$, expressed as $Fe_2O_3$.

The at least one oxidising agent may be fed in the form of a powder composed preferably of a mixture of oxide powders and/or the oxidising agent may be fed in the form of a glass containing this element, oxidising agent, for example in the form of a glass frit, of glass beads, or glass pieces.

The at least one oxidising agent may be mixed with the waste before the waste is fed into the metal can.

Or the oxidising agent may be mixed or chemically incorporated into the vitrification additive before they are fed into the metal can.

Or the oxidising agent may be fed directly into the metal can, separately from the waste and the vitrification additive.

Two or more of said methods, of feeding the oxidising agent may be combined.

The oxidising agent may be fed into the metal can continuously, or the oxidising agent may be fed into the metal can discontinuously.

The metal can may be made from an iron-based alloy such as a steel, for example a stainless steel, or a nickel-based alloy such as inconel.

The vitrification additive may be in the form of a mixture of oxide powders or it may be in the form of a glass, for example a glass frit, glass beads, or pieces of glass.

The vitrification additive may include oxides chosen from among $SiO_2$ (silica), $B_2O_3$ (boric oxide), $Al_2O_3$ (alumina), $Na_2O$ (sodium oxide), $Fe_2O_3$, CaO, $Li_2O$, ZnO, $ZrO_2$, etc.

Advantageously, the vitrification additive may be a borosilicate glass or a silicate glass.

The chemical element(s) to be confined, contained may be chosen from among the following chemical elements: Al, As, B, Ba, Ca, Ce, Cd, Cr, Cs, F, Fe, Gd, Hg, Li, Mg, Mn, Mo, Na, Ni, Nd, P, Pb, S, Sb, Tc, Ti, V, Zn, Zr, actinides such as Pu, platinoids, their isotopes, particularly their radioactive isotopes, and mixtures thereof.

The waste treated by the process according to the invention may be solid or liquid.

This waste may in particular be a solid or liquid nuclear waste.

In particular, the nuclear waste may be a radioactive liquid effluent such as a radioactive solution.

Or the nuclear waste could be a cullet, calcine of a radioactive liquid effluent, particularly a medium activity effluent.

The waste may also be derived from the incineration of radioactive wastes or household wastes.

The glass melt may be poured into a container and cooled in it, or the glass melt may be cooled in the metal can in which it was prepared.

The invention will now be described in detail in the following description given for illustrative and non-limitative purposes, with reference to the appended drawing.

BRIEF DESCRIPTION OF THE DRAWING

The single FIGURE is a schematic cross sectional view of a device for carrying out the process according to the invention.

DETAILED PRESENTATION OF PARTICULAR EMBODIMENTS

FIG. 1 shows a metal container or can (1) for implementation of the process according to this invention.

This can is usually in the form of a straight, vertical cylinder with a circular cross-section, open in its upper part and comprising a sidewall (2) and a base (3).

The diameter of this can is generally from 100 mm to 1000 mm and its height is from 100 mm to 1100 mm, and its volume may vary from 1 to 250 L.

This can is a metallic can, which means that its wall and its base are usually made from a metal or a metal alloy such as an iron-based alloy, for example a stainless steel, or a nickel-based alloy such as inconel.

This metal or alloy could be coated, depending on the case.

One of the advantages of the process according to the invention is that it makes it possible to use common metals and alloys without any particular resistance to corrosion and that are less expensive such as stainless steels, particularly steel grades 309, 310 or 314, while other processes according to the prior art without the addition of oxidising agents in the glass melt usually require metals and alloys with high resistance to corrosion such as work-hardened nickel-based alloys such as inconels, for example type 600 or 601 . . . , and special steels such as "ODS" steels with dispersion of oxides.

Obviously, these metals and alloys with high resistance to corrosion can also be used according to the invention.

The metal can is usually heated by putting the can in a medium frequency induction furnace (4), for example an induction furnace with a 200 kW generator operating at a frequency of 4 kHz. The glass inside the metal can is then melted by conduction in contact with the metal wall.

The can may also be heated in an electrical resistance furnace.

Heating is done until melting occurs, in other words it must be sufficient to create a melting bath or glass melt. The temperature of the melting bath must be high enough to cause total melting of the vitrification additive and of the oxidising agent, and to incorporate the waste to be confined. This temperature depends on the vitrification additive, the oxidising agent and the wastes to be confined.

When the vitrification additive is a borosilicate glass frit, the glass frit, oxidising agent and wastes mixture may usually be heated to a temperature of 900 to 1300° C., for example 1100° C. or 1200° C.

The vitrification additive is fed into the metal can through a duct (5) connected to the upper part of the metal can.

This vitrification additive (6) is usually chosen from among mixtures of oxide powders, and preferably from among glasses, but also from among glass precursors such as carbonates, nitrates, oxides, borides, nitrides, carbides, metals, sulphates, sulphides, hydroxides, etc., and mixtures thereof.

When glass is used, the glass may be in different forms: for example, it may be in flakes called "glass frit", beads, or even glass pieces.

Advantageously, the vitrification additive, for example the glass frit or precursors of it, may be in a physicochemical form like those currently used to introduce confinement glass in one of the waste confinement processes by vitrification known in the prior art.

Obviously, its composition depends on the objective sought in implementation of the vitrification process according to the invention, and particularly on the material, species and elements to be confined.

The vitrification additive used such as a glass frit may for example include various oxides, namely $SiO_2$ (silica), $B_2O_3$ (boric oxide), $Al_2O_3$ (alumina), $Na_2O$ (sodium oxide), $Fe_2O_3$, $CaO$, $Li_2O$, $ZnO$, $ZrO_2$, etc.

In particular, the vitrification additive may be a borosilicate glass or a silicate glass.

For example, when the vitrification additive such as a glass frit is to be used for confinement of a material such as a waste comprising radionuclides and/or metalloids and/or metals, the vitrification additive such as a glass frit is preferably a silicate glass. For example, it may be glass for example in the form of a glass frit comprising principally about 80% of $SiO_2$ (silica), $B_2O_3$ (boric oxide), $Al_2O_3$ (alumina) and $Na_2O$ (sodium oxide). In particular it may be a glass frit comprising from 20 to 80% or from 20 to 75% by mass of $SiO_2$, from 0 to 40% or from 0 to 25% by mass of $B_2O_3$, from 0 to 20% of $Fe_2O_3$; from 0 to 25% by mass of $Na_2O$; from 0 to 25% or from 0 to 20% by mass of $Al_2O_3$; from 0 to 20% or from 0 to 15% by mass of $CaO$; from 0 to 20% or from 0 to 10% by mass of $Li_2O$; from 0 to 20% by mass of $ZnO$; and from 0 to 20% or from 0 to 15% by mass of $ZrO_2$.

As borosilicate glass may be cited for example the so-called "R7T7" glass that is very frequently used for vitrification of fission products, and for which the composition is known.

Other vitrification additives known to those skilled in the art and suitable for confinement of specific waste can obviously be used within this invention.

According to the invention, the waste (7) containing the chemical element(s) to be confined is fed into the metal can (1). This waste is introduced into the metal can through the same pipe (5) shown in the single figure, but it could be introduced through a different, separate channel. Furthermore, the waste and the vitrification additive may be fed simultaneously or successively.

The element(s) to be confined is (are) not particularly limited and may be chosen from among the following chemical elements—Al, As, B, Ba, Ca, Ce, Cd, Co, Cr, Cs, F, Fe, Gd, Hg, La, Li, Mg, Mn, Mo, Na, Ni, Nd, P, Pb, S, Sb, Tc, Te, Ti, V, Zn, Zr, actinides such as Pu, platinoids, isotopes of said chemical elements, in particular radioactive isotopes of said chemical elements, and mixtures thereof.

The waste may be in solid or liquid form, for example in the form of a solution.

The process according to the invention is applicable particularly for solid or liquid nuclear waste.

This nuclear waste may for example be in the form of radioactive liquid effluents, particularly medium activity radioactive liquid effluents, for example aqueous solutions.

These radioactive liquid effluents may be nitric aqueous effluents containing metal or metalloid nitrates.

If the nuclear waste is a solid waste, it may particularly be a cullet, calcine of a radioactive liquid effluent, and particularly of an effluent with medium activity. The calcination step is usually done in a rotating tube, for example heated to 400° C. by an electric furnace. The solid cullet is crushed by a swinging bar located inside the rotating tube heated at the required temperature. A dilution additive or a calcination additive may be added.

The waste treated by the process according to the invention may also be a waste derived from incineration of household or radioactive waste.

According to the invention, at least one oxidising agent is added into the metal can in addition to the waste and to the vitrification additive.

The oxidising agent may be chosen from among nitrates and sulphates associated with a cation that may or may not itself have an oxidising action.

Thus, in the case of iron nitrate, it is difficult to determine if the oxidant is iron oxide derived from decomposition of the nitrate or the iron nitrate itself. As it decomposes, the iron nitrate produces iron oxide and $No_x$ and apparently a synergetic effect occurs between these two compounds that increases their respective effects, particularly their oxidising effects, and boosts their advantages.

On the other hand, in the case of aluminium nitrate, only the nitrate entity has an oxidising role.

Nitrates or sulphates, when hot, oxidise the glass bath, the glass melt, and enable it to counteract the reduction reactions of the multivalent elements of the glass melt by the metal can.

Preferably, the oxidising agent(s) is (are) chosen from among the multivalent oxidising elements.

Thus, this or these oxidising agent(s) may be chosen from among multivalent oxidising species of iron, chromium, vanadium, antimony, titanium, arsenic, cerium, manganese, chromium, ruthenium and mixtures thereof.

A multivalent oxidising species usually means a multivalent species with a high degree of oxidation, namely usually greater than or equal to 2 and possibly as high as 6, for example equal to 2, 3, 4, 5 or 6. In a redox couple of a single element, the multivalent oxide species used will be the one with the highest degree of oxidisation, for example in the Fe(III)/Fe(II) redox pair, the Fe(III) species will be used in the process according to the invention.

Preferably, the oxidising agent(s) is (are) chosen from among $Fe^{3+}$, $Ce^{4+}$, $Mn^{4+}$, $V^{5+}$, $Sb^{5+}$, $As^{5+}$, $Ru^{4+}$ and mixtures thereof.

The oxidising agent(s) such as the multivalent oxidising species mentioned above may be added in chemical form, for example in the form of oxides of these species or precursors of these oxides such as nitrates or sulphates. The nitrate or sulphate function performs an oxidising role but it is difficult to determine whether or not the nitrate function has a higher oxidising role than the oxide function.

It is advantageous to feed the oxidising agents in the form of oxides (or precursors of these oxides), for example oxides of elements taken in a high oxidising state such as $Fe^{3+}$, $Ce^{4+}$, $Mn^{4+}$, or $V^{5+}$, because once they have been added into the melting can, these oxides or precursors thereof are embedded, incorporated into the glass and oxidisation reactions occur between them and the glass, that counteract the reduction reactions generated by the metal elements of the can. Unlike oxidants added in the form of nitrates or sulphates, oxidants added in the form of oxides do not cause degassing, that would then have to be managed during the gas treatment.

Finally, the oxidising agent may also be chosen from among oxidising agents that do not form part of the composition of the final glass because they disappear completely at the melting temperature of the glass melt, during production of the glass or during confinement, containment. For example, these agents are nitric acid, etc.

Preferably, according to the invention, the oxidising agent is an agent that has a limiting effect on corrosion of the metal can such as $Fe_2O_3$.

It is quite surprising and it was completely unexpected that some oxidising agents could have such an effect limiting or even eliminating corrosion of the can. This effect limiting corrosion of the can due to the oxidising agent and particularly due to some specific oxidising agents has been demonstrated by the inventors and nothing had suggested that this would be the case.

In this particular advantageous embodiment, the process according to the invention not only prevents degassing and foaming phenomena but also prevents corrosion of the hot can.

The oxidising agent may be fed into the metal can in any appropriate form.

Thus, the oxidising agent may be fed in the form of a powder, particularly when it is an oxide, for example a powder composed of a mixture of oxides.

The oxidising agent may also be fed in the form of a glass, and particularly of a glass frit.

The oxidising agent may be mixed with waste before the waste is fed into the metal can, and/or the oxidising agent may be mixed with the vitrification additives before they are fed into the metal can and/or the oxidising agent may be fed directly into the metal can, separately from the waste and vitrification additives.

For example, in the case of an oxide or an oxide precursor, the oxidising agent may be chemically incorporated into the vitrification additive which is in the form of glass, and particularly a glass frit, before it is fed into the can.

In other words, since the vitrification additives are fed in the form of glass, particularly glass flakes, the oxidising agent(s) may be fed into this additive glass to give it an oxidising capacity.

The oxidising agent may be fed into the metal can continuously or discontinuously. Similarly the vitrification additives and the waste may be fed continuously or discontinuously. The oxidising agent, waste and vitrification additives may be fed in a single step or in several steps.

The nature of the oxidising agents such as the multivalent oxidising elements and their contents should be determined as a function of:
 the composition of the waste;
 the chemical species to be confined, contained;
 the capacity of the glass formulation to accept the incorporation of oxidising species;
 the process for feeding the vitrification additives (glass frit, powder mix, etc.);
 the oxidisation level at which the molten glass is to be kept;
 the importance of the reduction reactions between the metal crucible and the glass bath that are to be counteracted, this importance depending on the nature of the metal can, the high temperature glass residence time in the metal can, the temperature to which the vitrificate is raised during its production, and the glass composition;
 its impact on corrosion of the melting can.

The nature and quantity of oxidising agent to be used can be determined empirically for each type of waste.

The advantageous concentration ranges for oxidising agent(s) and for some particular oxidising agents have been mentioned above.

The waste, oxidising agent and the vitrification additive may be fed into the metal can in any order, in sequence; they may all be fed at the same point (for example through the duct 5) or at different points; and two or all three of them may be fed simultaneously into the reaction vessel through the same path or through different paths.

It has already been mentioned that one of the advantages of the process according to the invention, because it prevents reduction phenomena and can corrosion phenomena, is that it enables glass production over longer periods, with longer waiting phases at high temperature.

Thus, the process according to the invention could have a global duration for example of the order of 20 to 120 hours with waiting phases or holding phases at high temperatures, for example at 900 to 1200° C., for a duration from a few minutes (for example 2, 5, 10 minutes) to several tens of hours (for example 20, 30, 50, 100 hours).

For example, the process according to the invention may comprise 2 to 5 feed phases lasting for 4 to 12 hours each followed by a waiting, holding phase, of the glass melt at a high temperature, each with a duration of 10 to 14 hours.

The process according to the invention is fully adaptable, completely variable in terms of its global duration and the nature, number, duration and conditions of the various phases.

The glass melt may be cast in a container different from the metal can and cooled in the metal can, or the glass melt may be cooled in the metal can (in-can melting).

Finally, note that the device shown in the single figure comprises a duct (8) to release gases from the metal can and to transfer them to a gas treatment installation (not shown).

The invention will now be described with reference to the following examples, given for illustrative and non-limitative purposes.

EXAMPLES

In the following examples, the vitrification of wastes is done in metal cans (in-can melting) in an installation complying more or less with the scheme in FIG. 1.

Note that these examples are limited to the study of the vitrification step in the can, pot, only, without considering the subsequent cooling step.

The volume of the metal can, container, used in all the examples is about 50 litres.

It is heated to 1100° C. by resistances.

A mixture of wastes and vitrification additives is continuously fed into the metal can during the feed phases, each lasting for about 12 hours.

The wastes are in the form of a nitric aqueous solution containing the chemical species to be confined. These species are Li, S, Zr, F, Na (with 50% by mass of the solution), Cd (with 15% by mass of the solution), Fe, Ca, Cr, Al, Mg, Nd and Zn (with 10% by mass of the solution).

The wastes solution is fed at a flow rate of about 5 L/h.

The vitrification additives that will provide oxides complementary to the waste oxides, to achieve the final glass composition, are added in the examples in the form of glass flakes called "glass frit" at a flow rate of about 2.5 kg/h.

One of the special features of the tests done in the following examples is the alternation between 12-hour continuous feed phases and standby phases in which the temperature is held for about 12 hours. These two phases are alternated until the can is full and contains about 110 kg of glass.

Once cooled, the can is separated from the rest of the process.

In the examples given below, the composition of the wastes solution is always the same and is as defined above, and the flow rate is the same.

However, metal cans made from different types of steel and different vitrification additives are used, in other words vitrification additives without the addition of an oxidising additive or with the addition of various types of oxidising additives.

The glass reduction for each example is estimated by measuring the oxygen pressure in the molten glass at 1100° C. using an electrochemical system such as a "Rapidox" furnace sold by "Glass-Service®".

Foaming, degassing, the formation of metal particles and sulphur balls, beads, and corrosion of the metal can are observed for each example.

Example 1

This example is an example nonconforming with the invention in which no oxidising additives are added into the vitrification additive.

The composition of the waste solution is described above;

In this example, the can is a 316L stainless steel can.

The vitrification additive is composed of the following oxides, without any addition of oxidising additives: $SiO_2$ 62.5%, $B_2O_3$ 19.5%; $Li_2O$ 1.89%; $ZrO_2$ 3.42%; $Na_2O$ 7.59%; $Al_2O_3$ 3.51%.

The measured oxygen pressure is $10^{-10}$ atmospheres.

Cadmium has partially vaporised, volatilized, the cadmium content analysed in the glass is 1.52% by mass compared with 2.67% expected.

Foaming phenomena and severe material entrainment occurred during production of the glass, as was clearly seen in the process gas treatment system, and these gases contained cadmium.

Furthermore, severe corrosion of the can and the presence of sulphide balls, beads, was observed.

Example 2

This is an example according to the invention in which oxidising additives are added into the vitrification additive.

The waste solution is the same as in example 1.

In this example, the can is a 310 stainless steel can (NS30).

The vitrification additive used is a frit containing 3% by mass of iron, predominantly with oxidation degree +III that gives it a slightly oxidising capacity.

The iron oxide is added into the frit in order to provide acceptable properties to the material for its production in the process.

In other words, the vitrification additive contains 3% by mass of $Fe_2O_3$ as the oxidising agent and a preparation containing 3.6% by mass of $Fe_2O_3$ in the glass melt is targeted, since part of the $Fe_2O_3$ originates from the waste.

Therefore the composition by mass of the glass frit that makes up, constitutes the vitrification additive is $SiO_2$ 60%, $B_2O_3$ 19%; $Li_2O$ 2%; $ZrO_2$ 2%; $Na_2O$ 7%; $Fe_2O_3$ 3%; CaO 2%; $Al_2O_3$ 3%; $Nd_2O_3$ 2%.

The oxygen pressure increases to $10^{-9.3}$ atmosphere.

The glass is slightly more oxidised than it is in example 1, which has the consequence of limiting cadmium reduction phenomena to the metal state and consequently reducing degassing phenomena compared with example 1.

Corrosion of the can is significant and comparable to that in example 1.

No sulphide balls, beads, or metal particles are observed.

Example 3

This example is an example according to the invention in which oxidising additives are added into the waste solution.

The waste solution is the same as that in examples 1 and 2.

The can and the glass frit constituting, forming the vitrification additive are the same as those used in example 2, except that 9% additional iron III oxide is also added into the waste solution such that the final glass contains 12.6% by mass of $Fe_2O_3$ iron oxide (namely 9%+3.6%).

The oxygen pressure in the final glass is considerably higher than in examples 1 and 2 because it is equal to $10^{-3.1}$ atmosphere.

At this oxygen pressure, the cadmium is fully oxidised and no longer causes any degassing.

Furthermore, no settled sulphide balls or metal particles are observed.

Furthermore, the metal can is only slightly corroded.

These examples confirm the advantage obtained during vitrification of waste in hot metal can processes, and particularly the "in-can melter" process, due to the addition of oxidising elements that in particular prevent foaming and volatility phenomena and the formation of metal particles. These examples also show that the addition of oxidising elements to counteract reduction of the glass bath by the hot can can become even more useful if the oxidising elements are acting to limit corrosion of the hot can.

The invention claimed is:

1. Process for confining a waste containing at least one chemical species to be confined, by vitrification in a heated metal can composed of either an iron-based alloy or a nickel-based alloy, wherein the process consists of adding only the waste, a vitrification additive and at least one oxidizing agent into the iron-based alloy or nickel-based alloy metal can, such that the waste and the vitrification additive melt in reactive contact with said metal can during the vitrification process for producing a glass melt and the glass melt is cooled, characterized in that the vitrification additive is an oxide or mixture of oxides selected from the group consisting of: $SiO_2$, $B_2O_3$, $Al_2O_3$, $Na_2O$, $Fe_2O_3$, CaO, $Li_2O$, $ZnO$, $ZrO_2$, and $Nd_2O_3$ and wherein the at least one oxidizing agent is selected from the group consisting of multivalent oxidizing species of iron, chromium, vanadium, antimony, titanium, arsenic, cerium, manganese, chromium, ruthenium and mixtures thereof, and wherein the at least one oxidizing agent is provided separately from the vitrification additive, wherein the at least one oxidizing agent is not part of the waste wherein either the at least one oxidizing agent is mixed with the waste before the waste is fed into the metal can, or the at least one oxidizing agent is mixed with the vitrification additive before either the vitrification additive is fed into the metal can, or the oxidizing agent is fed directly into the metal can, separately from the waste and the vitrification additive, and wherein the concentration of said at least one oxidizing agent expressed as an oxide or oxides in the glass melt is in a range of from 0.1 to 20% by mass of the mass of the glass melt for allowing minimal reduction of the glass melt by the metal can to occur while minimizing degassing and foaming from occurring during the vitrification process thereby improving the glass melt properties.

2. Process according to claim 1, wherein said multivalent oxidizing species is selected from the group consisting of $Fe^{3+}$, $Ce^{4+}$, $Mn^{4+}$, $Sb^{5+}$, $As^{5+}$, $V^{5+}$, $Ru^{4+}$, and mixtures thereof.

3. Process according to claim 1, wherein said at least one oxidizing agent is selected from the group consisting of one or more oxides or precursors of oxides.

4. Process according to claim 1, wherein said at least one oxidizing agent is an agent that has a limiting effect on the corrosion of the metal can.

5. Process according to claim 1, wherein the concentration of the oxidizing agent, for an oxidizing agent used alone, is in a range of from 0.1% to 1% by mass when the oxidizing species is chromium ($Cr^{3+}$), expressed as $Cr_2O_3$; from 1 to 15% by mass when the oxidizing agent is vanadium ($V^{5+}$), expressed as $V_2O_3$; from 0.5 to 8% by mass when the oxidizing agent is antimony ($Sb^{5+}$), expressed as $Sb_2O_5$; from 1 to 15% by mass when the oxidizing agent is titanium ($Ti^{4+}$), expressed as $TiO_2$; from 0.5% to by mass when the oxidizing agent is arsenic ($As^{5+}$), expressed as $As_2O_5$; from 0.5 to 10% by mass when the oxidizing agent is cerium ($Ce^{4+}$), expressed as $CeO_2$; from 0.1 to 2% by mass when the oxidizing agent is manganese ($Mn^{4+}$), expressed as $MnO_2$; and from 1 to 20% by mass when the oxidizing agent is iron ($Fe^{3+}$), expressed as $Fe_2O_3$.

6. Process according to claim 5, wherein when the oxidizing agent is iron, the concentration is in a range from 1.0 to 15% by mass.

7. Process according to claim 6, wherein the concentration is in a range from 3.0 to 13% by mass.

8. Process according to claim 7, wherein the concentration is in a range from 4.0 to 13% by mass.

9. Process according to claim 8, wherein the concentration is in a range from 5.0 to 13% by mass.

10. Process according to claim 9, wherein the concentration is in a range from 10 to 13% by mass.

11. Process according to claim 10, wherein the concentration is in a range from 12 to 13% by mass.

12. Process according to claim 11, wherein the concentration is 12.6% by mass.

13. Process according to claim 1, wherein the oxidizing agent is added in the form of a powder.

14. Process according to claim 13, wherein the powder is a mixture of oxide powders.

15. Process according to claim 1, wherein the oxidizing agent is added in the form of a glass.

16. Process according to claim 15, wherein the oxidizing agent is selected from the group consisting of a glass frit, glass beads and glass pieces.

17. Process according to claim 1, wherein the oxidizing agent is fed into the metal can continuously.

18. Process according to claim 1, wherein the oxidizing agent is fed into the metal can discontinuously.

19. Process according to claim 1, wherein the vitrification additive is either in the form of a mixture of oxide powders or a glass.

20. Process according to claim 19, wherein when the vitrification additive is a glass, it is selected from the group consisting of a glass frit, glass beads and glass pieces.

21. Process according to claim 1, wherein the vitrification additive is a borosilicate glass or a silicate glass.

22. Process according to claim 1, wherein the chemical element to be confined is selected from the group of the following chemical elements: Al, As, B, Ba, Ca, Ce, Cd, Cr, Cs, F, Fe, Gd, Hg, Li, Mg, Mn, Mo, Na, Ni, Nd, P, Pb, S, Sb, Tc, Ti, V, Zn, Zr, actinides, platinoids and mixtures thereof.

23. Process according to claim 22, wherein the chemical element to be confined is a radioactive isotope.

24. Process according to claim 1, wherein the waste is in a solid or liquid form.

25. Process according to claim 24, wherein the nuclear waste is a radioactive liquid effluent.

26. Process according to claim 25, wherein the radioactive liquid effluent is a radioactive solution.

27. Process according to claim 26, wherein the radioactive solution is a medium activity solution.

28. Process according to claim 24, wherein the nuclear waste is a cullet of radioactive liquid effluent.

29. Process according to claim 28, wherein the nuclear waste is a medium activity effluent.

30. Process according to claim 1, wherein the waste is a waste derived from the incineration of radioactive waste or household waste.

31. Process according to claim 1, wherein the glass melt is cooled in the metal can in which it was prepared.

32. Process according to claim 1, wherein the concentration of the oxidizing agent in the glass melt ranges from 4.0 to 20% by mass.

33. Process according to claim 32, wherein the concentration of the oxidizing agent in the glass melt ranges from 5.0 to 15% by mass.

34. Process according to claim 33, wherein the concentration of the oxidizing agent in the glass melt ranges from 10 to 13% by mass.

35. Process according to claim 1, wherein the vitrification additive is a glass frit comprising about 80% of $SiO_2$, $B_2O_3$, $Al_2O_3$ and $Na_2O$.

36. Process according to claim 1, wherein the vitrification additive comprises from 20 to 80% by mass of $SiO_2$, from 0 to 40% by mass of $B_2O_3$, from 0 to 20% by mass of $Fe_2O_3$, from 0 to 20% by mass of $Al_2O_3$, from 0 to 20% by mass of $CaO$, from 0 to 20% by mass of $Li_2O$, from 0 to 20% by mass of $ZnO$, and from 0 to 15% by mass of $ZrO_2$.

37. Process for confining a waste containing at least one chemical species to be confined, by vitrification in a heated metal can composed of either an iron-based alloy or a nickel-based alloy, wherein the waste and a vitrification additive are fed into the iron-based alloy or nickel-based alloy metal can, such that the waste and the vitrification additive melt in reactive contact with said metal can during the vitrification process for producing a glass melt with improved glass melt properties, and the glass melt is cooled, characterized in that the vitrification additive is not part of the waste and includes oxides selected from the group consisting of: $SiO_2$, $B_2O_3$, $Al_2O_3$, $Na_2O$, $Fe_2O_3$, CaO, $Li_2O$, ZnO, $ZrO_2$, and $Nd_2O_3$ and includes additional additives selected from glass precursors consisting of carbonates, nitrates, oxides, borides, nitrates, carbides, sulphates, sulphides, hydroxides and mixtures thereof and wherein at least one oxidizing agent selected from the group consisting of multivalent oxidizing species of iron, chromium, vanadium, antimony, titanium, arsenic, cerium, manganese, chromium, ruthenium and mixtures thereof is further fed into the metal can as an addition, independent and separate from the addition of the waste and said vitrification additive, said oxidizing agent(s) expressed as an oxide or oxides in the glass melt, added in a concentration ranging from 0.1 to 20% by mass of the mass of the glass melt for allowing minimal reduction of the glass melt by the metal can to occur while minimizing degassing and foaming from occurring during the vitrification process.

\* \* \* \* \*